United States Patent [19]
Bordener

[11] Patent Number: 5,755,983
[45] Date of Patent: May 26, 1998

[54] MOLD AND DIVIDER ASSEMBLY FOR CREATING A SOLID-SURFACE COUNTERTOP HAVING AN EXTERIOR EDGE ACCORDING TO DIFFERENT SHAPES AND SIZES

[75] Inventor: Robert Bordener, Bloomfield Hills, Mich.

[73] Assignee: Talon Surfaces, LLC, Troy, Mich.

[21] Appl. No.: 606,479

[22] Filed: Mar. 4, 1996

Related U.S. Application Data

[63] Continuation-in-part of Ser. No. 596,662, Feb. 5, 1996.
[51] Int. Cl.$^6$ .................................................. B28B 7/02
[52] U.S. Cl. .......................... 249/102; 249/155; 249/156; 249/158; 249/160
[58] Field of Search .................................. 249/158, 102, 249/155, 156, 160

[56] References Cited

U.S. PATENT DOCUMENTS

| | | |
|---|---|---|
| 1,514,053 | 11/1924 | Keeter .................................. 249/158 |
| 5,253,932 | 10/1993 | Nesovic ................................ 312/140.3 |

*Primary Examiner*—Thomas R. Weber
*Attorney, Agent, or Firm*—Gifford, Krass, Groh, Sprinkle, Patmore, Anderson & Citkowski, P.C.

[57] ABSTRACT

A mold and divider assembly for creating a solid surface countertop having an exterior edge according to different shapes and sizes. The mold includes a planar shaped surface which is bounded by a polygonal shaped body, at least one side of which has a raised and inwardly contoured mold defining edge. A first elongated dividing member equals a length of a first selected side of the mold and is placeable upon the planar surface so as to be movable in directions towards and away from the first selected side. A second elongated dividing member extends between the first dividing member and a second selected side of the mold so that the dividing members define in combination a subset area of the mold for receiving a resinous material pour. The second dividing member may be providing in differing lengths as a kit for producing an assortment of countertops according to differing dimensions. The mold may further be provided in a generally L-shape or rectangular shape. A further modification of an L-shaped mold receives an attachment member at different spatial distances to produce a seamless unitary countertop.

20 Claims, 4 Drawing Sheets

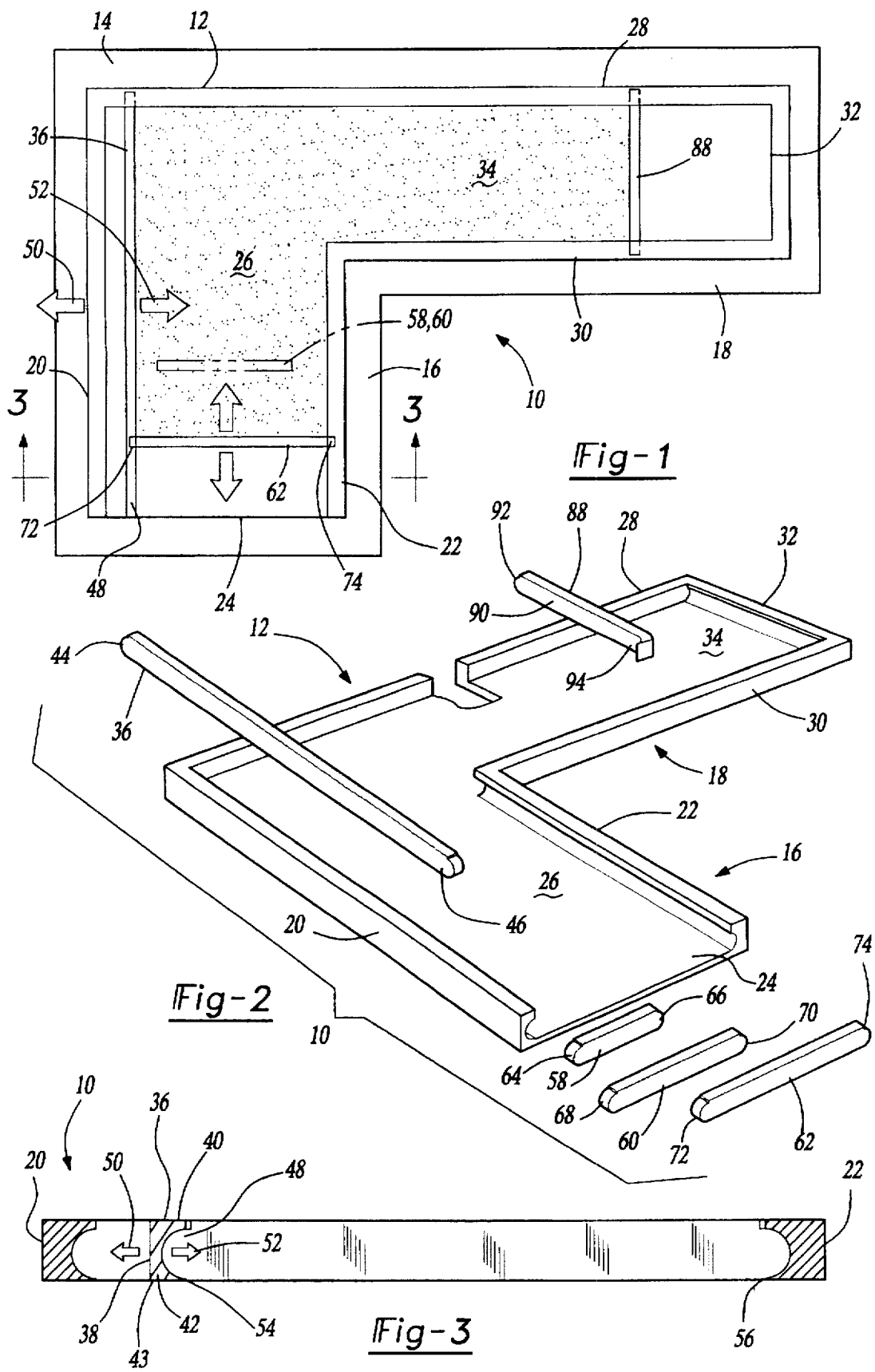

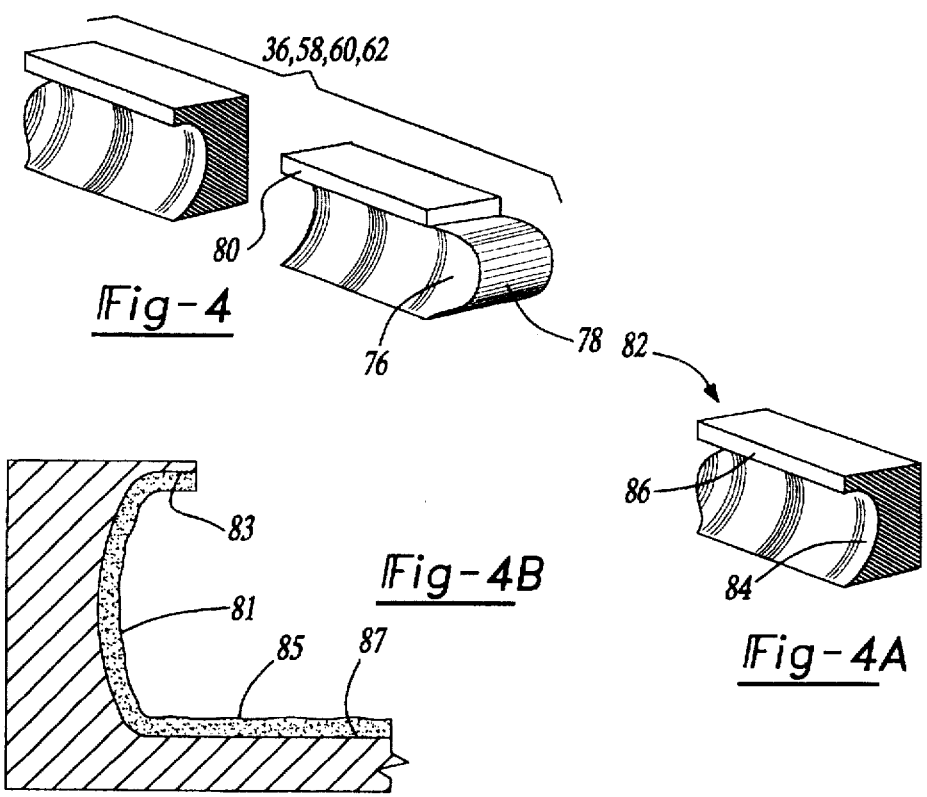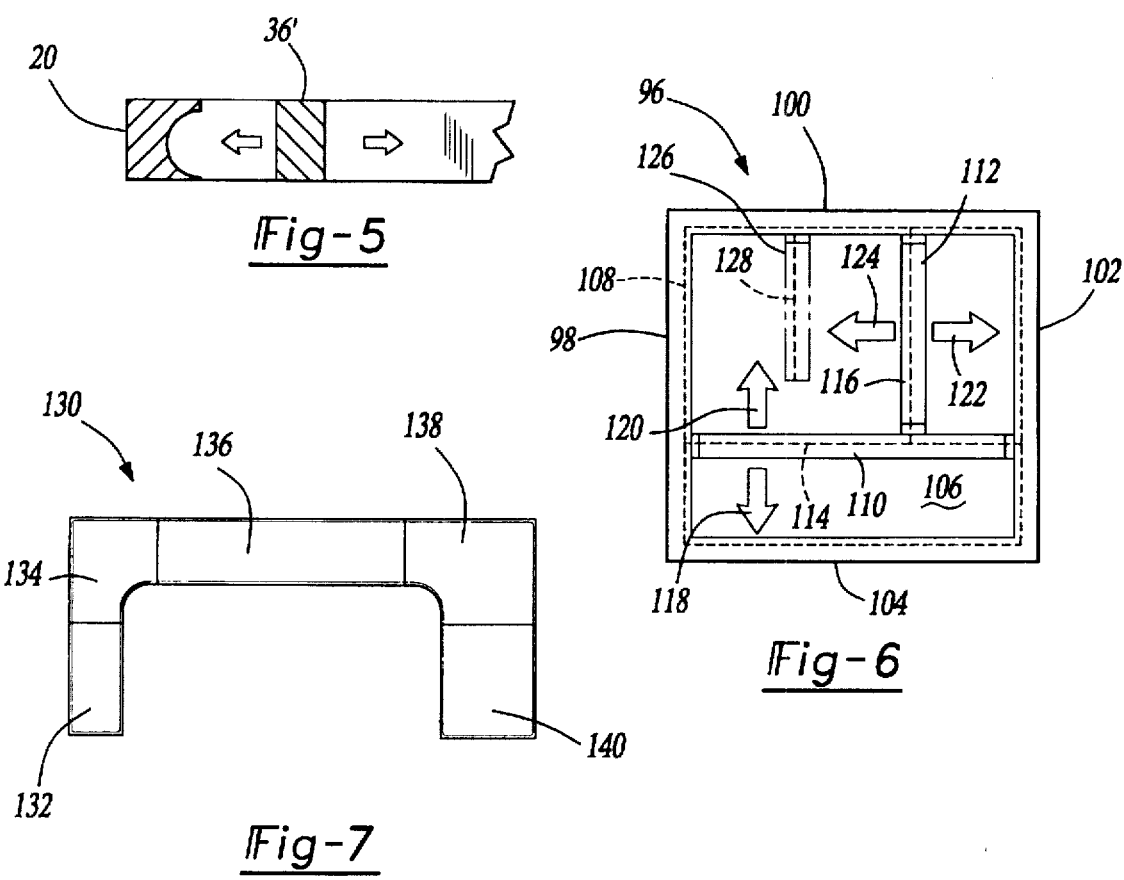

MOLD AND DIVIDER ASSEMBLY FOR CREATING A SOLID-SURFACE COUNTERTOP HAVING AN EXTERIOR EDGE ACCORDING TO DIFFERENT SHAPES AND SIZES

CROSS-REFERENCE WITH RELATED APPLICATIONS

This is a Continuation-in-part of application Ser. No. 08/596,662 filed on Feb. 5, 1996, now pending, for an ADJUSTABLE DIVIDER ASSEMBLY FOR USE WITH AN OPEN-TOP MOLD FOR CREATING A COUNTERTOP WITH A BUILT-UP EDGE AND METHOD FOR CREATING A COUNTERTOP UTILIZING THE DIVIDER ASSEMBLY.

BACKGROUND OF THE INVENTION

1. Field of the Invention

The present invention relates generally to mold assemblies for creating a solid-surface countertop and, more particularly, to a mold and divider assembly for creating a countertop having an exterior edge, the dividers being provided as a kit according to quickly differing lengths to permit the creation of a countertop according to differing shapes and sizes.

2. Description of the Prior Art

The present invention is concerned with mold assemblies for creating solid-surface countertops, specifically those having an L-shape, U-shape or rectangular island shape.

Traditionally, the dimensional requirements of the typical angled or island shaped countertops have dictated the necessity of fabricating the countertops in individual pieces and assembling them together onsite into the desired configuration. The set-up time and fabricating considerations required in taking nominal sized sheet stock countertop materials such as Dupont CORIAN or Formica SURRELL, fabricating them into individual solid-surface components having exterior built-up edges and finally assembling them together in a puzzle type arrangement tends to be a very time intensive and, as a consequence, very expensive endeavor. The abutting boundaries between the opposing edges of the individual pieces further need to be worked upon to provide an overall consistency to the surface finish of the countertop, resulting in an additional investment of time and materials. Either of those prior art materials also require more expensive and multiple steps of cutting, gluing, planing and shaping with a router. Such materials on the market also are too heavy to be carried into a job site as a single piece and are furthermore not as rigid as may be desired. It therefore readily becomes apparent that the existing technologies employed in creating an L-shape, U-shape or island countertop are very inefficient and result in a more expensive end product to the consumer.

U.S. Pat. No. 5,253,932, issued to Nesovic, teaches a modular countertop system which utilizes a plurality of flat unedged surface-providing sheet members and front edged facing members to construct a countertop having an angular and, preferably, a U-shaped configuration. The individual pieces are provided as a plurality of pre-fabricated members which are delivered for assembly in the shop or at the job site. The pieces include one or more pre-fabricated countertops which are secured atop a horizontal cabinet surface by an adhesive. The countertops each have an outwardly extending surface with an inwardly stepped edge. An edging portion with an outwardly rounded edge has a tongue portion which is contoured so that the edging may be attached to the stepped edge of the countertop by an appropriate adhesive. A backsplash portion may also be attached to a vertical surface of a wall to finish the installation.

The primary disadvantage of Nesovic is that the components of the modular system still must be prefabricated on a relatively large scale and according to fixed dimensions prior to their transportation and on-site assembly. The professed advantage of Nesovic is that it permits the assembly of such a modular system without the need of sophisticated and expensive equipment or specially trained fabricators. However, taking into consideration the number of small pieces which must be pre-cast, trimmed of flash and bonding surfaces, prepped and transported for assembly, it is evident that a significant time and effort investment is still required at the production step and again at the assembly step.

Furthermore, taking into consideration the number of required pieces and use of adhesive necessary to assemble a countertop according to even the most basic dimensions, it is evident that the system of Nesovic tends to be very limited in regards to the dimensions of the countertop which can be created. As is furthermore evident from the teachings of Nesovic, the only way to ensure that a large number of differently sized assemblies can be created according to its system is to prefabricate a great number of components in complete sets according to differing sizes, with the accompanied cost of prefabrication and inventory as well as the difficulty in color matching all pieces.

The shortcoming of the prior art is that it fails to teach an effective manner in which an angled or island shaped countertop can be manufactured according to a reasonably adjustable range of differing dimensions and without a premium investment in fabrication and installation time.

SUMMARY OF THE PRESENT INVENTION

The present invention is a mold and divider assembly for creating a solid surface countertop with an exterior edge according to a plurality of different shapes and sizes. A polygonal mold shaped body includes a flat planar surface which is bounded by a plurality of raised and inwardly contoured edges. A first elongated divider member is provided which is substantially equal in length to a side of the mold and is arranged within the mold in parallel fashion relative to the side. The first divider member is movable across the mold planar surface in directions both towards and away from the associated side. A second divider member according to a desired length is positioned within the mold so as to extend in a generally perpendicular fashion between the first divider member and a second selected side of the mold.

The first and second dividers preferably have inwardly contoured sides similar to the inwardly contoured edges of the mold and, upon placement within the mold body, define a subset mold area for receiving a resinous material pour or spray. Preferably, a plurality of second divider members are provided according to differing overall lengths and, upon positioning of the first divider member and placement of a selected second divider member within the mold, defines a subset mold area according to a desired length and width.

The mold and divider assembly according to a preferred embodiment of the invention includes a rectangular shaped mold body having four inwardly facing and contoured edges which is subdivided by a first divider member and a selected second divider member in order to create an island-shaped countertop.

The assembly according to a further preferred embodiment provides an L-shaped mold body having a first leg portion and a second leg portion. First and second divider members are inserted within the first leg portion to subdivide a desired mold area and a third divider member is optionally positioned at a desired location extending across a width of the second leg portion to define a length of the mold area along the second leg portion.

A further modification of the L-shaped mold body is provided and teaches the second leg portion as having a planar and elevated outer edge which corresponds to an abutting wall edge and a raised and inwardly contoured inner edge portion which extends from the connection with the first leg portion a distance less than the overall axial length of the second leg portion. A recess extends beyond the inwardly contoured inner edge portion to an axial end of the second leg portion. An attachment member is shaped in a manner similar to the first leg portion of the L-shaped member and includes a base portion and first and second leg portions. The first leg portion contacts an opposing end of the raised inner edge portion of the second leg and the second attachment leg portion overlaps the width of the second leg to come into abutting contact with the abutting wall edge. A kit of lengthening insert members each having either a contoured inner edge, a modified contour, or a flattened edge and according to differing lengths is provided, with a selected one of the lengthening inserts being placed end-to-end to the end of the raised and inwardly contoured inner edge portion in order to extend the contoured inner edge a desired additional length and, upon placement of the attachment member, to define an overall U-shaped mold area for the creation of a one-piece seamless countertop.

BRIEF DESCRIPTION OF THE DRAWINGS

Reference will now be made to the attached drawings, when read in combination with the following specification, wherein like references refer to like parts throughout the several views, and in which:

FIG. 1 is a plan view of the mold and divider assembly according to a first preferred embodiment of the present invention illustrating a set of subset dividing members arranged in an L-shaped mold body;

FIG. 2 is an elevational view in perspective of the L-shaped mold as illustrated in FIG. 1 and illustrating the shape and configuration of the elonaged dividing members;

FIG. 3 is a cutaway view taken along line 3—3 of FIG. 1 and illustrating the range of movement of the first dividing member in directions both towards and away from its associated mold defining edge;

FIG. 4 is a perspective view, reduced in length for convenience of illustration, showing the shape and configuration of an inwardly contoured elongated dividing member according to the present invention;

FIG. 4a is a perspective view of an alternatively configured cross section of either a mold defining side or dividing member according to a further desired embodiment in which the inwardly facing contour is shaped as a non-constant radius;

FIG. 4b is an end view in cross section of a further modified inner contour of a mold defining edge or divider member which enables the creation of an easily filleted bullnose exterior edge;

FIG. 5 is a view similar to that shown in FIG. 3 and illustrating in cross section a first dividing member having a flattened mold defining edge;

FIG. 6 is a plan view of a mold and divider assembly according to a further preferred embodiment of the present invention and illustrating a rectangular shaped mold with dividing members for creating an island-shaped countertop;

FIG. 7 is a plan view in two dimension of a generally U-shaped mold assembled of different modular components according to a yet further preferred embodiment of the present invention;

DESCRIPTION OF THE PREFERRED EMBODIMENTS

Figure 8:
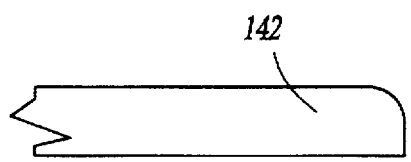
FIG. 8 is a side view of a molded countertop displaying a single slab with roundover top edge.

Referring to FIGS. 1 and 2, a mold and divider assembly 10 is shown for creating a solid surface countertop with an exterior edge. A mold 12 is constructed of a polygonal shaped body which is supported on a generally horizontally extending planar base 14 (see FIG. 1). The mold body 12 can be of any desired polygonal configuration, but forms a preferably L-shape having a first leg 16 and a second perpendicularly extending leg 18. The mold may be constructed of any desired material but is preferably either a vinyl ester "tooling gel" coating over fiberglass wood or stainless steel.

As is best illustrated in FIG. 2, the first leg 16 is bounded by a first raised and inwardly contoured side 20 and a second raised and inwardly contoured side 22 which extends in a spaced and substantially parallel fashion relative to the first side 20. As is evident from the perspective drawing, the mold defining edges of the sides 20 and 22 are illustrated as being contoured in a generally bullnosed pattern, however, as will further be discussed, numerous other types of profiles may be utilized for creating countertops having many different types of exterior edging. The leg 16 terminates in an open side 24, however the side 24 may also be a closed end with an inwardly contoured edge if desired. The sides 20, 22 and 24 define in combination a general area 26 of a flat planar surface of the mold.

The second leg 18 of the L-shaped member likewise includes a raised and inwardly contoured mold defining edge 30 and a spaced and parallel extending inwardly contoured mold defining edge 28. An inwardly contoured end surface 32 is closed in contrast to the open end 24 of the first leg 16 and in combination with the sides 28 and 30 defines a general planar mold surface area 34 for the second leg 18. The mold areas 26 and 34 in combination form a contiguous mold pattern for the creation of a countertop having an angled profile.

Referring again to FIGS. 1 and 2, and further to FIG. 3, the divider assembly for use with the mold 12 according to the present invention is shown and includes a first elongated divider member 36. The divider member 36 has a generally rectangular profile as defined by an outer face 38, a top face 40 and a bottom face 42 (see FIG. 3) and is preferably constructed of a polymer or other type of non-stick material. As is also better illustrated in FIGS. 1 and 2, the divider member 36 extends a length substantially equal to the overall dimension of the side 20 of the first leg 16. According to a desired embodiment, a first end 44 and a second end 46 of the divider member 36 is shaped in a generally outwardly contour in order to be sealingly arranged within the mold cavity as will be subsequently described. Alternatively, the ends 44 and 46 may be flat or may have a profile matching and desired profile.

Referring again to FIG. 3, the first divider member 36 includes an inwardly contoured inner face 48 which is similar to that displayed by the inwardly contoured sides defining the mold perimeter and, upon placement of the divider member 36 by application of a two-sided adhesive 43 between the divider underside 42 and the mold planar surface, provides an adjustable end face member which replaces the mold side 20. The divider member 36 is movable in a parallel extending fashion across the mold planar surface in directions both towards and away from the mold side 20 as is evidenced by a first directional arrow 50 and a second directional arrow 52. The divider member 36 is preferably positioned at a desired location upon the mold surface whereupon a two-sided adhesive or other type releasably securing means is applied to the underside 42 of divider 36 and the divider is then press fit upon the mold surface. As is again further illustrated from the view of FIG. 3, a fillet of material 54 may be applied to the boundary between the mold planar surface and a slight vertical offset of the divider which defines in part the inwardly facing contour. A similar fillet 56 may also be provided along the corresponding bottom edge of the inwardly contoured mold defining side 22. The purpose of the fillets is to ensure that the countertop to be produced includes a smooth rounded contour along its exterior edge and assures an almost total elimination of all post mold fabricating steps.

Referring again to FIGS. 1 and 2, a plurality of second elongated divider members, illustrated as a divider member 58, divider member 60 and divider member 62 (FIG. 2), is shown. Each of the divider members 58, 60 and 62 are shaped substantially identical to the divider member 36, the only difference being that the second divider members are provided according to differing overall lengths. Specifically, each of the dividers have a generally elongated profile, with the divider 58 having outwardly contoured ends 64 and 66, the divider 60 having outwardly contoured ends 68 and 70, and the divider 62 having outwardly contoured ends 72 and 74. Dividers 58, 60 and 62 are inwardly or flat contoured, depending upon if the countertop is facing an open side or against a wall, appliance or cabinet.

As is best illustrated in the plan view of FIG. 1, a selected second elongated divider, for example divider 62, is positioned upon the mold planar surface upon first having located the first divider member 36 at the desired position either toward or away from the mold defining side 20. The first outer contoured end 72 of the divider member 62 seats within the inwardly contoured face 48 of the substantially perpendicularly arranged divider member 36 and the second outer contoured end 74 likewise seats within the inwardly facing contour of the mold defining side 22.

The first and second divider members define, in combination, a subset area upon the mold planar surface of the L-shaped first leg 16 for receiving a subsequent pour of an uncured curable resin material. The inwardly facing edges of the second divider members 58, 60 and 62, while not being visible in FIGS. 1 and 2, are optionally shaped in an inwardly contoured bullnose pattern similar to that displayed by the first divider member 36 and the mold defining sides or flat if against a wall, appliance or tall cabinet.

The inwardly facing edges of the second divider members 58, 60 and 62 may also be flattened in profile when it is desirable to produce a flat vertical edge to the countertop, primarily for an abutting wall surface or similar surface. FIG. 5 shows a cross section of a further first divider member 36' having a flattened cross sectional profile and the second divider members could likewise be shaped in this fashion if desired.

FIGS. 4 and 4a further illustrates in perspective an ideal view of preferred configurations of the first and second divider members. Referring to FIG. 4, a divider member which is shaped according to any of the dividers 36, 58, 60 and 62 includes an inwardly contoured edge 76 which extends to an outwardly contoured end 78 of the member. Placement of the outwardly contoured end 78 within an inwardly contoured edge of a corresponding mold defining side or associated divider member results in a generally curved corner shape to the mold defining area which is desirable during the creation of a countertop according to the invention. A generally horizontally disposed top portion 80 of the divider facilitates the installation and removal of the divider.

FIG. 4a illustrates an alternative cross section 82 which may be incorporated into either a mold defining side or divider member as desired. An inwardly contoured surface 84 is shaped in a generally non-constant radius and terminates in an upper edge in a horizontally disposed top portion 86. The contoured surface 84 is designed to provide a more rounded look to the countertop exterior edge without sacrificing ease in installation of such a design. The section 82 allows for shorter overhangs, less contemporary look, and easier filleting.

Referring now to FIG. 4b, an end view is shown in cross section of a further modified inner profile 81 of either a mold defining edge or divider member. The profile 81 is preferably a modified non-constant radius with a substantially greater central radius portion and a greater defined curved upper and lower edge tangentially merging into the central radius. A forwardly projecting lip 83 extends horizontally from an upper edge of the profile 81.

A gelcoat layer of material 85 is applied by conventional means, e.g spraying or brushing, to the profile 81 and a planar base 87. The profile 81 permits easy application of the gelcoat layer while still retaining adequate holdability of the material against the mold surface by maintaining material compression forces.

Referring again to FIGS. 1 and 2, a third elongated divider member 88 is provided and extends across a width of the second leg 18 of the L-shaped member between the mold defining sides 28 and 30. The member 88 preferably includes an inwardly contoured face 90 for creating a substantially bullnosed countertop edge and has a first outwardly contoured end 92 and a second curved and contoured end 94. The second end 94 is optional to an end identical to end 92 and is ideal for creating a more pronounced rounded curve. Other types of shapes and attachment bracketry may also be utilized with the divider members to create the desired corner configuration of the countertop to be produced. Specifically, an alternative set of molds may be provided, each having a 45 degree inside angle for cabinets of similar dimension. The concept of the mold and divider assembly as described in FIGS. 1-5 is to facilitate the creation of an L-shaped or modified L-shaped countertop product according to a reasonably small set of differing dimensions. It has been determined that a vast majority of kitchen countertop installations abide by a basic set of length and width dimensions which vary to only a reasonable degree.

Specifically, the side 24 of the first leg 16 equals 36" in length according to the preferred embodiment. The length of the mold side 28 is further 156", or thirteen feet, and the width of the far end 32 is 25½". The majority of countertop products produced will have a standardized width of 25½", therefore only a single third divider member 88 is necessary for defining an axial length of a straight countertop run in a range which is beyond the 36" of the first leg up to the maximum length.

Likewise, the angled portion of the countertop product which corresponds to the leg portion 16 of the L-shaped mold will, in the majority of instances, adhere to a given set of dimensions whereby the width of the angled or wing portion will be either 25½", 30" or 36". The first divider member 36 is consequently placed within the mold a measured distance from the mold defining side 22 and a second divider member 58, 60 or 62 of corresponding length is placed at a desired point between the divider 36 and the mold side 22.

The placement of the second divider member also defines the length of the mold's angled component of the product to be created as dictated by the dimensions of the kitchen installation. As is again best shown in FIG. 1, placement of the divider members according to the present invention assembly within the mold establishes a mold subset as illustrated by the area in cross shading. As is clearly evident from this disclosure, the paramount advantage of the present invention is that it enables the creation of a countertop product according to a standardized set of length and width dimension while requiring only a minimum of time and effort expenditure in setup.

FIG. 6 illustrates a further preferred embodiment 96 of the present invention for the creation primarily of an island-shaped countertop product. A rectangular shaped mold includes first, second, third and fourth sides 98, 100, 102 and 104 which bound a planar mold surface area 106. While the island mold according to embodiment 96 is shown in plan view, it preferably includes raised and inwardly contoured inner facing sides as illustrated by the mold defining sides of the mold 12 according to the first preferred embodiment. An internal surface is illustrated by phantom line 108 and represents the inner contour of the inwardly facing sides.

A first elongated divider member 110 is provided which is equal in length to the distance separating the sides 98 and 102 of the rectangular shaped mold and is arranged to receive a second elongated divider member 112 which extends perpendicularly between the first member 110 and side 100. The divider member 110 includes an inwardly contoured edge defined by phantom line 114 and the divider member 112 includes a similar edge defined by phantom line 116.

The divider 110 is movable along directions 118 and 120 within the mold boundary and the divider 112 is likewise movable in a perpendicular fashion along directions 122 and 124. A selected one of a number of additional second divider members, illustrated by divider 126 may be substituted for the divider 116 upon appropriate repositioning of the first divider member 110 to provide a different length or width dimension to the countertop island to be created. The overall mold configuration can also be that of an elongated rectangle rather than the substantially square shape shown in the drawing. Specifically, the mold may have a length of 146" and a width of 60", with the first divider member being a floating bar equal to the 146" dimension and the second divider members coming in an assortment of lengths ranging from 30", 36", 42" and 51" for creating an assortment of differently dimensioned rectangular shaped products. The further divider member 126, or other divider of desired length, may also be inwardly contoured as defined by a phantom line 128 for divider 126 or may alternatively display a planar end face as has been previously described. In some instances it may be desirable to produce a countertop according to these dimensions with at least one flat wall abutting surface, however in most instances an island countertop product is desired which displays four curved exterior edges.

Referring now to FIG. 7, a plan view of a customized countertop 130 is shown having a generally U-shape and constructed of a number of separately fabricated pieces. Specifically, the countertop 130 is constructed of a first rectangular piece 132, a second modified L-shaped piece 134, a third rectangular piece 136, a fourth and additionally modified L-shaped piece 138 and, finally, a fifth and additionally modified rectangular piece 140. The purpose of FIG. 7 is to illustrate that the L-shaped and rectangular shaped molds may be used in concert to produce any desired countertop piece which follows most existing installation specifications for creating a left hand, right hand, L or assembled U-shape kitchen countertop.

Figure 9:
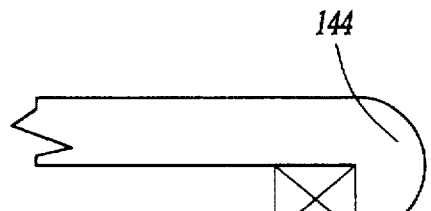
FIG. 9 is a side view of a molded countertop displaying a single slab with a bullnose edge and an underside interior cavity for receiving a substrate support member.

Referring now to FIGS. 8-11, a series of countertops are shown which display differently configured exterior edges. FIG. 8 illustrates a simple slab with roundover shaped top edge which can be produced using the inwardly configured edges previously described and by closely monitoring the casting thickness of the resinous plasticized material. FIG. 9 illustrates a countertop edge having a generally bowlnosed pattern which can be obtained by utilizing the previously described mold and divider edges and a two pour mold process.

Figure 10:
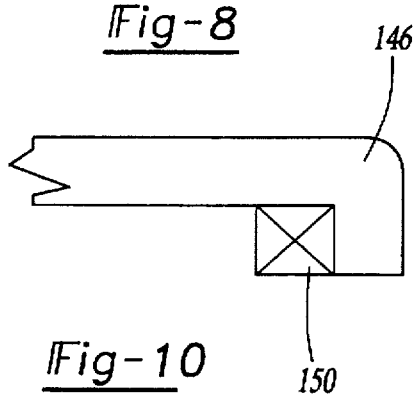
FIG. 10 is a side view of a molded countertop displaying a roundover edge with an underside interior cavity for receiving a substrate support member.
Figure 11:
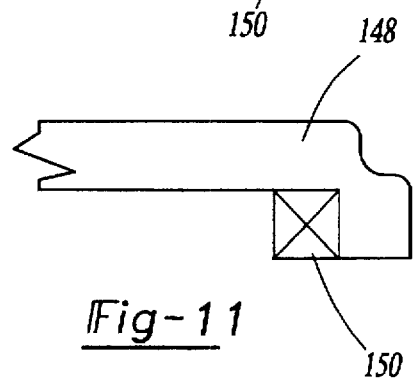
FIG. 11 is a side view of a molded countertop displaying an ogee edge with an underside interior cavity for receiving a substrate support member.

FIG. 10 illustrates a randover exterior edged countertop, the creation of which requires the reconfiguration of the inwardly facing mold defining sides and inwardly contoured divider edges. In order to create a randover-type edge, the curvature of the mold defining surfaces would each start out as a semi-spherical curved portion adjacent the mold planar surface which proceeds to a substantially vertical and straight extending upper portion as can be envisioned. FIG. 11 illustrates a further ogee shaped edge defining variation which would likewise require an inwardly stepped pattern to be formed within the mold and divider defining surfaces.

In each of FIGS. 9, 10 and 11, a cavity extends longitudinally along an interior underside of the countertop offset from the specific exterior configuration. The cavity is again produced by utilizing a one or two step three resinized material pour process and a substrate support member, illustrated in cross section at 150, is mounted to the underside of the countertop. The castings discussed above may further be produced utilizing a solid homogeneous saturated resin, a veneer or layered version of a resin, a fiberglass or other similar type material.

Figure 12:
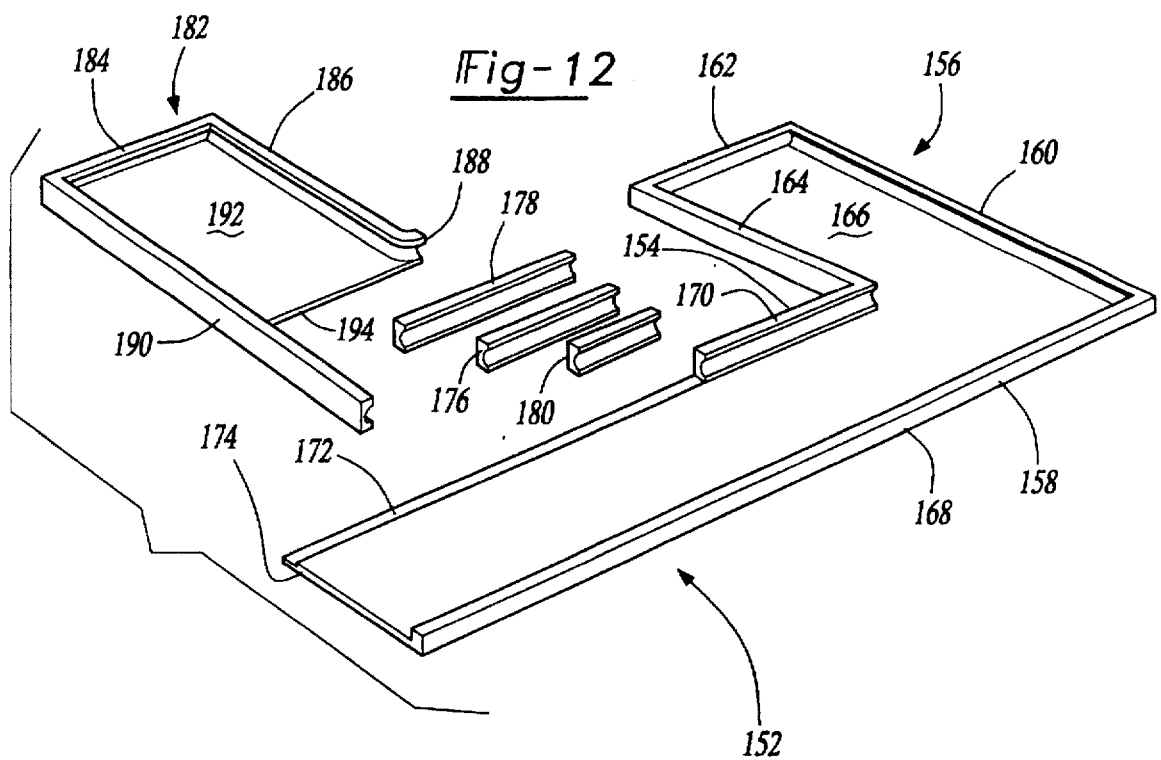
FIG. 12 is a mold and divider assembly in partially exploded view and illustrating a modification of an L-shaped mold member with an adjustably locatable attachment member for creating a seamless one piece countertop according to a further preferred embodiment of the present invention.
Figure 13:
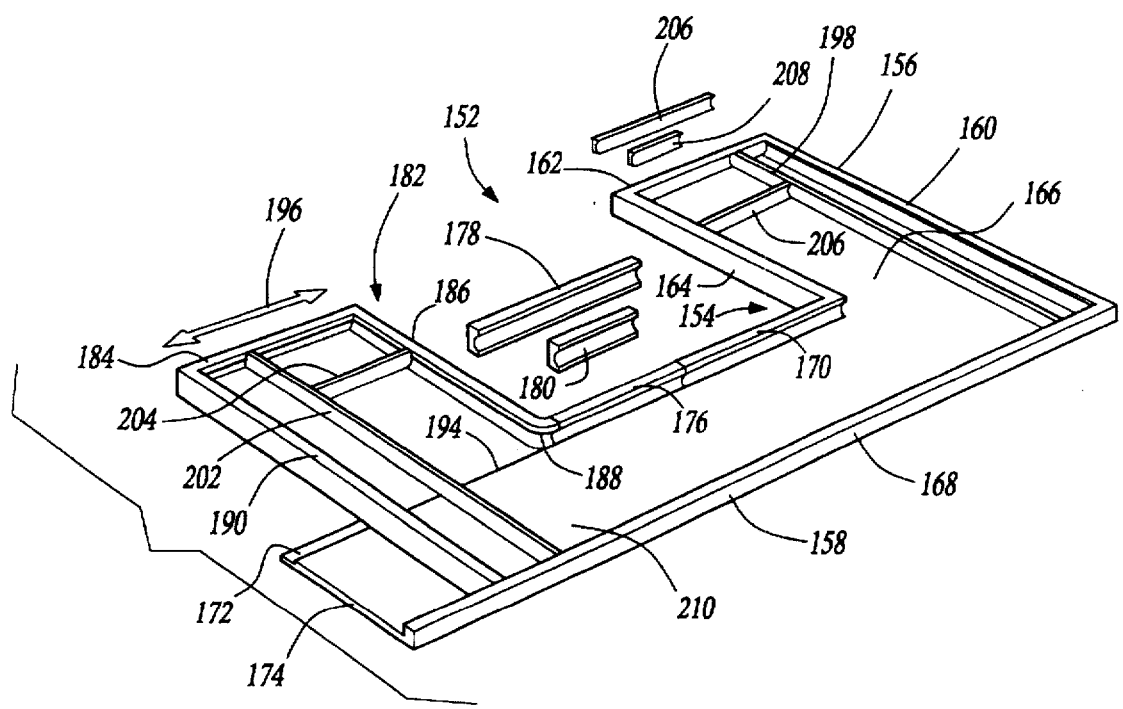
FIG. 13 is a view of the preferred embodiment according to FIG. 12 in an assembled fashion and further illustrating the elongated dividing members and the kit of divider insert members for selectively lengthening the middle dimension of the unitary U-shaped countertop.

Referring now to FIGS. 12 and 13, a further embodiment of the present invention is shown for setting up a one-piece U-shaped mold 152 for creating a seamless countertop product. The advantage of such a mold is to make possible the production of the countertop in a single pour and following a single setup procedure and to eliminate the need for excessive seams in the countertop, such an assembly replacing the requirements of a countertop product produced according to the previous disclosure of FIG. 7.

As seen in FIG. 12, an exploded view of such a mold assembly 152 includes a first generally L-shaped member 154 which is a modification of the L-shaped mold previously discussed. The L-shaped member includes a first leg 156 and a second leg 158 which extends in a substantially perpendicular fashion and a greater length than the first leg 156. The first leg 156 is bounded by a first side 160, second side 162 and third side 164 which form inwardly contoured and elevated mold defining surfaces and which define in combination a general U-shape which bounds a planar mold surface area 166. As illustrated in FIG. 12, while the sides 160-164 are each inwardly contoured along their mold defining faces in a fashion similar to the earlier discussed embodiments, they may also display bull nose, ogee, roundover or any other type desired configurations.

The second L-shaped leg 158 includes a planar and elevated outer edge 168 which is substantially a flat and vertically extending planar member and an inwardly contoured inner edge portion 170 extending perpendicularly from a connection with the first leg side 164. The raised and inwardly contoured inner edge portion 170 extends a desired distance along the inner edge of the second leg and terminates well short of the axial end of the second leg. Extending beyond the raised inwardly contoured edge portion 170 is a recessed portion 172 which extends along the edge to the axial end of the leg 158. A width of the second leg 158 is defined by an end surface 174 extending between the inner edge 172 and outer and continuous raised edge 168.

Referring again to FIG. 12, a plurality of lengthening insert members is illustrated as members 176, 178 and 180, each having a shape and configuration similar to the dividing insert members previously discussed including the inner facing and inwardly contoured mold defining edge and each further according to a desired length. The purpose of the lengthening insert members is to extend the overall length of the raised inner edge 170 to selectively increase the straight run portion of the seamless countertop across the second leg 158 as will be subsequently described.

An attachment member 182 is provided as a separate piece and includes a base portion 184, a first leg portion 186 extending generally perpendicularly from a first end of the base portion and terminating in a curved end portion 188, and a second leg portion 190 extending generally perpendicularly from a second end of the base portion in a substantially parallel fashion relative to the first leg portion and a distance beyond the first leg portion equal to the width 174 of the L-shaped member end 168. A planar mold surface 192 is also provided within the generally U-shape configuration of the attachment member and terminates in an edge 194 extending between an end of the first leg portion 186 and an intermediate point of the second leg portion 190.

The base portion 184 and leg portions 186 and 190 are preferably inwardly contoured along their inner mold defining edge to assist in the creation of an outwardly configured countertop edge, however one or more substantially planar surfaces may be provided to account for a wall abutting countertop surface. Although not shown in the drawing, one of the inwardly contoured mold defining surfaces could receive an appropriate insert with an oppositely and outwardly contoured mating surface and a planar inner surface for quickly converting an inner contour to a planar contour.

Referring now to FIG. 13, an assembly of the modified mold and divider assembly is shown which is set up for a resin or other material pour in order to create a seamless U-shaped countertop product. A selected one of the lengthening insert members, in this instance member 176 is placed in an end-to-end fashion and in abutting contact with the opposing end of the raised and inwardly contoured inner edge 170. The member 176 may conventionally be attached upon the recess 172 by using a two-sided adhesive or other releasable bonding material as previously described.

Upon positioning of the lengthening member to increase the straightaway run length of the L-member leg 168, the attachment member 182 is ready to be placed in proximity with the L-member 156. The attachment member 182 is positioned so that the curved end portion 188 of the first leg 186 matingly engages with the opposing end of the raised and inwardly contoured lengthening member 176 to spatially distance the attachment member 182 a desired length from the angled leg 156 of the L-member. The attachment member edge 192 longitudinally overlaps the axial recess 172 in the inner edge and the second leg portion 190 of the attachment member extends across the width of the leg 158 until it abuts against an inner face of the elevated outer edge 168.

When positioned in proximity to the L-member 154, the attachment member 182 forms a mirror shape of the leg portion 156 by extending in a like parallel direction and at the established spatial distance. The substitution of lengthening inserts further results in the attachment member being adjustable along a direction identified by arrow 196 for establishing a different straight run distance for the U-shaped countertop to be produced. In one preferred embodiment, the outer edge 168 of the L-member has an axial length of 14 feet and the perpendicular side 160 and leg portion 190 a length of 10 feet. The inner edge portion 170 of the L-member straight run further has a length of 5 feet and the lengthening inserts any desired additional lengths for spatially positioning the attachment member upon the L-member.

A first elongated width dividing member 198 and a selected second elongated length dividing member 200 may also be positioned within the L-member bounded area 166 to further subdivide the mold area and likewise a further width member 202 and selected length member 204 may be provided for subdividing the mold area provided by the attachment member. Additional length dividing inserts 206 and 208 may also be substituted within either the L-member leg 156 or attachment member 182 to provide desired dimensions. The embodiment of FIG. 13 illustrates a subset area 210 created by the mold assembly setup according to this further preferred embodiment.

Having described my invention, it will become apparent to those skilled in the art that the mold and divider assembly herein described and claimed provides a revolutionary improvement in setup and production time over prior art mold assemblies. This is accomplished by creating a single piece casting kitchen having an "L" or "U" shape which is seamless. These specific features allow for extremely streamlined distribution to the ultimate degree of direct sales to installers, lumber yards and to consumers yielding further significant cost reductions. Reference is now made to the appended claims when read in combination with the preceding description of the preferred embodiments.

I claim:

1. A mold and divider assembly for creating a solid surface countertop with an exterior edge, said mold and divider assembly comprising:

a polygonal shaped mold body with a generally flat planar surface and a surrounding enclosure which is defined by a plurality of sides, a selected plurality of raised edges being provided and each of said raised edges corresponding to a selected side of said plurality of sides around a periphery of said generally flat planar surface;

a first elongated divider member which is substantially equal in length to a first selected side of said mold, said first divider member being arranged within said mold in parallel fashion with respect to said first selected side and further being movable upon said planar surface in directions both towards and away from said first selected side; and a second elongated divider member which is sized according to a desired length which is less than said first elongated divider member and which is positioned within said mold in abutting fashion with said first elongated divider member and so as to extend in a generally perpendicular fashion from said first elongated member to a second selected side of said mold;

said first and second elongated divider members establishing at least a portion of a subset area within said mold, which is less than a total surface area of said mold as defined by said flat planar surface, for receiving a volume of a liquified resinous material.

2. The mold and divider assembly according to claim 1, said plurality of sides of said mold body further comprising a selected number of said sides which are defined along an inner face by a raised and inwardly contoured edge, corresponding ends of said first and second elongated divider members which engage against said inner faces of said mold each having outwardly contoured edges for sealing within said inwardly contoured edges.

3. The mold and divider assembly according to claim 2, said first elongated divider member and said second elongated divider member each further comprising an inner side which defines a part of a boundary of said subset area, at least one of said inner sides likewise having a raised and inwardly contoured edge corresponding in shape with said inner faces of said mold to create said exterior edge of said countertop.

4. The mold and divider assembly according to claim 2, said first elongated divider member and said second elongated divider member each further comprising an inner side which defines a part of a boundary of said subset area, at least one of said inner sides having a flat vertical edge for defining a wall abutting surface of said countertop.

5. The mold and divider assembly according to claim 3, further comprising a plurality of second elongated divider members according to differing lengths, a selected one of said second divider members being placed within said mold upon positioning of said first elongated divider member to establish said subset area.

6. The mold and divider assembly according to claim 1, further comprising said mold forming a substantially L-shape having a first leg and a second leg, said first and second elongated divider members defining a first subset area of said first leg, a third elongated divider member being inserted between opposing and parallel extending sides of said second leg to define a second subset area.

7. The mold and divider assembly according to claim 3, further comprising said mold forming a substantially rectangular shape having first, second, third and fourth sides, said subset-defining and inwardly contoured edges of said first and second divider members contributing to said exterior edge of an island shaped countertop.

8. The mold and divider assembly according to claim 2, said mold further comprising:

an L-shaped member having a first leg and a second leg extending perpendicularly from said first leg and being substantially greater in length than said first leg;

an attachment member being positioned relative to said L-shaped member and extending in a generally perpendicular fashion at a desired position along said second leg and at a spaced distance from said first leg;

said L-shaped member and said attachment member defining in combination a unitary U-shaped mold for creating a one-piece and U-shaped seamless countertop.

9. The mold and divider assembly according to claim 8, said first leg of said L-shaped member being bounded by elevated and inwardly contoured mold defining edges, said second leg having a planar and elevated outer edge and a raised and inwardly contoured inner edge portion extending a distance less than an overall axial length of said second leg, a recess extending beyond said raised and inwardly contoured edge portion along said inner edge to an end of said second leg.

10. The mold and divider assembly according to claim 9, said attachment member further comprising:

a raised and inwardly contoured base portion;

a raised and inwardly contoured first leg portion extending generally perpendicularly from a first end of said base portion and terminating in a curved end portion which matingly engages with an opposing end of said raised and inwardly contoured inner edge portion of said second leg;

a raised and inwardly contoured second leg portion extending generally perpendicularly from a second end of said base portion in a substantially parallel fashion relative to said first leg portion, a planar mold surface being provided within a generally U-shaped area defined by said base portion and said first and second leg portions; and said second leg portion extending a distance beyond said first leg portion equivalent to a width of said second leg of said L-shaped member and abuttingly contacting said planar and elevated outer edge of said second leg.

11. The mold and divider assembly according to claim 10, further comprising a plurality of lengthening insert members each having an inner facing and inwardly contoured edge, a selected lengthening insert according to a given length being placed in an end-to-end fashion and in abutting contact with said end of said raised and inwardly contoured second leg inner edge portion, said attachment member being likewise positioned at an opposing end of said selected insert to axially adjust an overall length of said seamless U-shaped countertop mold.

12. The mold and divider assembly according to claim 11, a first and a second elongated divider member being positioned within at least one of a first surface area defined by said first leg of said L-shaped member and a second surface area defined by said attachment member to define a mold subset area.

13. The mold and divider assembly according to claim 2, further comprising at least one of said divider members and said mold defining edges having an inwardly contoured edge according to a non-constant radius, an upper and horizontally extending pour defining portion establishing an upper limit of said resinous material pour.

14. The mold and divider assembly according to claim 3, said at least one inwardly contoured edge of said divider member further comprising a slight vertical offset from said planar mold surface, a fillet being applied along a length of said offset to form a continuous molded edge within said subset area.

15. The mold and divider assembly according to claim 1, further comprising a two-sided adhesive applied to an underside of each of said divider members for releasably attaching said divider member upon said flat planar surface of said mold.

16. The mold and divider assembly according to claim 1, at least one of said elongated divider members further comprising an arcuately shaped end for establishing a curved edge within said mold subset area.

17. The mold and divider assembly according to claim 3, said inwardly contoured edges of said mold faces and said dividers creating a single slab with randover top edge around a perimeter of said countertop.

18. The mold and divider assembly according to claim 3, said inwardly contoured edges of said mold faces and said dividers creating a bullnose shaped exterior edge around a perimeter of said countertop, a cavity being formed along an inner underside of said bullnose for receiving a substrate support member.

19. The mold and divider assembly according to claim 3, said inwardly contoured edges of said mold faces and said dividers creating a randover shaped exterior edge around a perimeter of said countertop, a cavity being formed along an inner underside of said randover for receiving a substrate support member.

20. The mold and divider assembly according to claim 3, said inwardly contoured edges of said mold faces and said dividers creating an ogee shaped exterior edge around a perimter of said countertop, a cavity being formed along an inner underside of said ogee for receiving a substrate support member.

* * * * *